US012663804B2

(12) United States Patent
Sheu et al.

(10) Patent No.: US 12,663,804 B2
(45) Date of Patent: Jun. 23, 2026

(54) DUAL SPINNING LASER-BASED UAV POSITIONING AND LANDING SYSTEM AND METHOD

(71) Applicant: National Tsing Hua University, Hsinchu City (TW)

(72) Inventors: Jang-Ping Sheu, Hsinchu City (TW); Yung-Ching Kuo, Taichung City (TW)

(73) Assignee: National Tsing Hua University, Hsinchu City (TW)

( * ) Notice: Subject to any disclaimer, the term of this patent is extended or adjusted under 35 U.S.C. 154(b) by 107 days.

(21) Appl. No.: 18/930,959

(22) Filed: Oct. 29, 2024

(65) Prior Publication Data

US 2026/0086560 A1 Mar. 26, 2026

(30) Foreign Application Priority Data

Sep. 25, 2024 (TW) ................................. 113136272

(51) Int. Cl.
*G05D 1/247* (2024.01)
*B64U 70/95* (2023.01)
(Continued)

(52) U.S. Cl.
CPC ............. *G05D 1/247* (2024.01); *B64U 70/95* (2023.01); *G05D 1/6545* (2024.01); *H02J 7/70* (2026.01); *G05D 2111/17* (2024.01)

(58) Field of Classification Search
CPC .. G05D 1/247; G05D 1/6545; G05D 2111/17; B64U 70/95
See application file for complete search history.

(56) References Cited

U.S. PATENT DOCUMENTS

| | | | |
|---|---|---|---|
| 11,492,114 B1 * | 11/2022 | Filipovic | G08G 5/22 |
| 2008/0120854 A1 * | 5/2008 | Zhang | G01C 15/008 |
| | | | 33/286 |

(Continued)

FOREIGN PATENT DOCUMENTS

| | | |
|---|---|---|
| CN | 107885223 | 4/2018 |
| CN | 111076725 | 4/2020 |

(Continued)

OTHER PUBLICATIONS

"Office Action of Taiwan Counterpart Application", issued on May 13, 2025, p. 1-p. 4.

(Continued)

*Primary Examiner* — Peter D Nolan
*Assistant Examiner* — Wae L Louie
(74) *Attorney, Agent, or Firm* — JCIPRNET

(57) ABSTRACT

Provided is a dual spinning laser-based unmanned aerial vehicle (UAV) positioning and landing system including a first laser module, a first rotating module, a second laser module, a second rotating module, a signal transceiver, a controller and a substrate, and a method thereof. The first laser module is configured to provide a first light beam emitted by rotating around a first axis. The first rotating module is configured to drive the first laser module to rotate around a rotation axis perpendicular to the first axis to allow the first light beam to scan in a space. The second laser module is configured to provide a second light beam emitted by rotating around a second axis. The second rotating module is configured to drive the second laser module to rotate around a rotation axis perpendicular to the second axis to allow the second light beam to scan in the space.

17 Claims, 12 Drawing Sheets

(51) Int. Cl.
   *G05D 1/654* (2024.01)
   *H02J 7/70* (2026.01)
   *G05D 111/10* (2024.01)

(56) References Cited

U.S. PATENT DOCUMENTS

| | | | | |
|---|---|---|---|---|
| 2017/0050749 | A1* | 2/2017 | Pilskalns | B60L 53/37 |
| 2018/0245365 | A1* | 8/2018 | Wankewycz | E04H 6/44 |
| 2019/0072385 | A1* | 3/2019 | Lombardi | G01C 15/002 |
| 2019/0204838 | A1* | 7/2019 | Haque | G05D 1/0278 |
| 2020/0225684 | A1* | 7/2020 | Anderson | B64U 70/95 |
| 2021/0090143 | A1* | 3/2021 | Chalkley | H04N 23/69 |
| 2021/0097710 | A1* | 4/2021 | Aslandere | G06N 3/08 |
| 2021/0116941 | A1* | 4/2021 | Lee | G05D 1/0094 |
| 2021/0157336 | A1* | 5/2021 | Kwak | G05D 1/0094 |
| 2022/0363408 | A1 | 11/2022 | Cowden | |
| 2026/0086560 | A1* | 3/2026 | Sheu | G05D 1/247 |

FOREIGN PATENT DOCUMENTS

| | | |
|---|---|---|
| TW | 202041424 | 11/2020 |
| TW | 1744979 | 11/2021 |
| WO | 2018193776 | 10/2018 |
| WO | 2022249181 | 12/2022 |

OTHER PUBLICATIONS

Yung-Ching Kuo et al., "Laser-Assisted Guidance Landing Technology for Drones", The 21st IEEE International Conference on Mobile Ad-Hoc and Smart Systems (MASS 2024), Sep. 23-25, 2024, pp. 1-6.

* cited by examiner

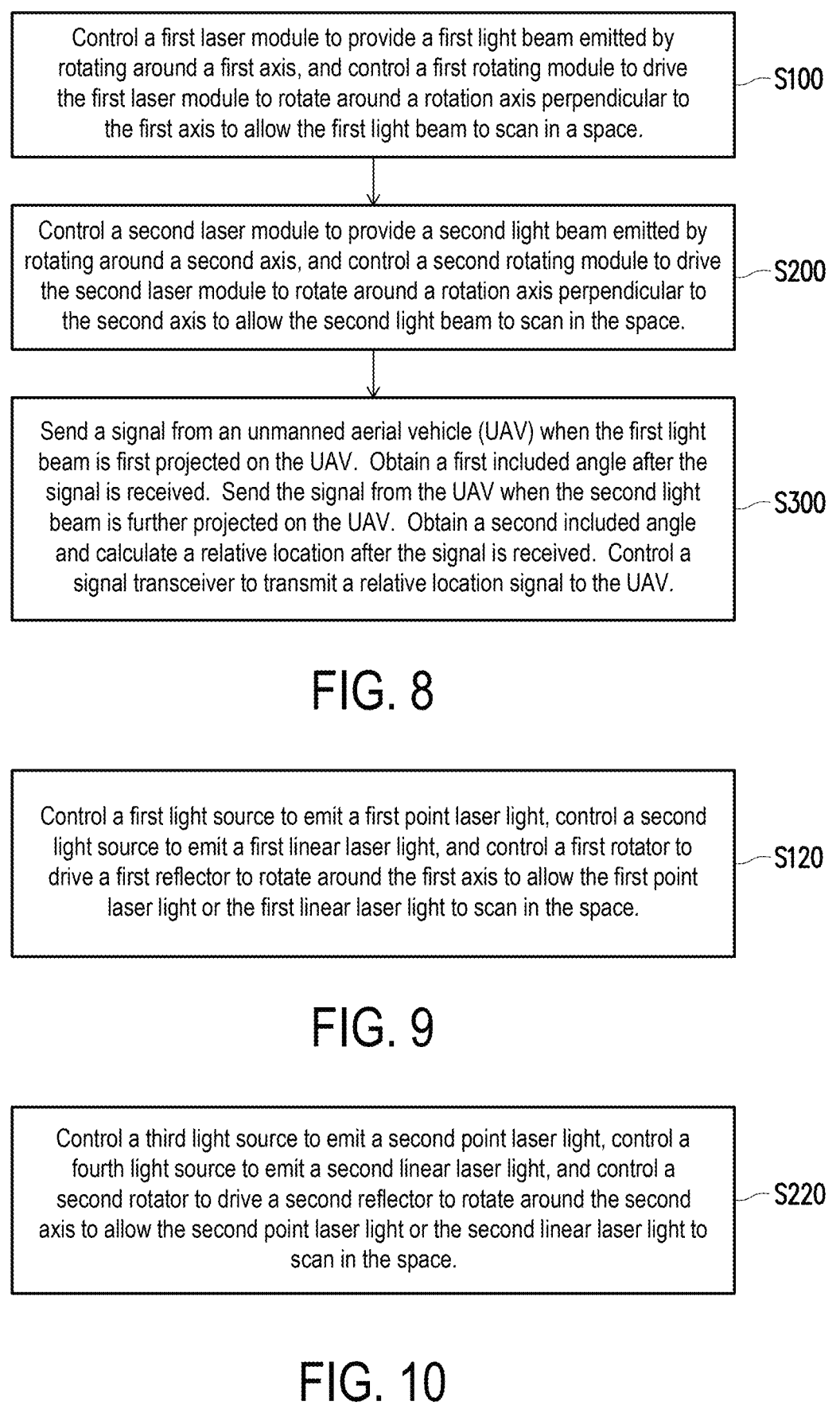

Control a first laser module to provide a first light beam emitted by rotating around a first axis, and control a first rotating module to drive the first laser module to rotate around a rotation axis perpendicular to the first axis to allow the first light beam to scan in a space. — S100

Control a second laser module to provide a second light beam emitted by rotating around a second axis, and control a second rotating module to drive the second laser module to rotate around a rotation axis perpendicular to the second axis to allow the second light beam to scan in the space. — S200

Send a signal from an unmanned aerial vehicle (UAV) when the first light beam is first projected on the UAV. Obtain a first included angle after the signal is received. Send the signal from the UAV when the second light beam is further projected on the UAV. Obtain a second included angle and calculate a relative location after the signal is received. Control a signal transceiver to transmit a relative location signal to the UAV. — S300

FIG. 8

Control a first light source to emit a first point laser light, control a second light source to emit a first linear laser light, and control a first rotator to drive a first reflector to rotate around the first axis to allow the first point laser light or the first linear laser light to scan in the space. — S120

FIG. 9

Control a third light source to emit a second point laser light, control a fourth light source to emit a second linear laser light, and control a second rotator to drive a second reflector to rotate around the second axis to allow the second point laser light or the second linear laser light to scan in the space. — S220

FIG. 10

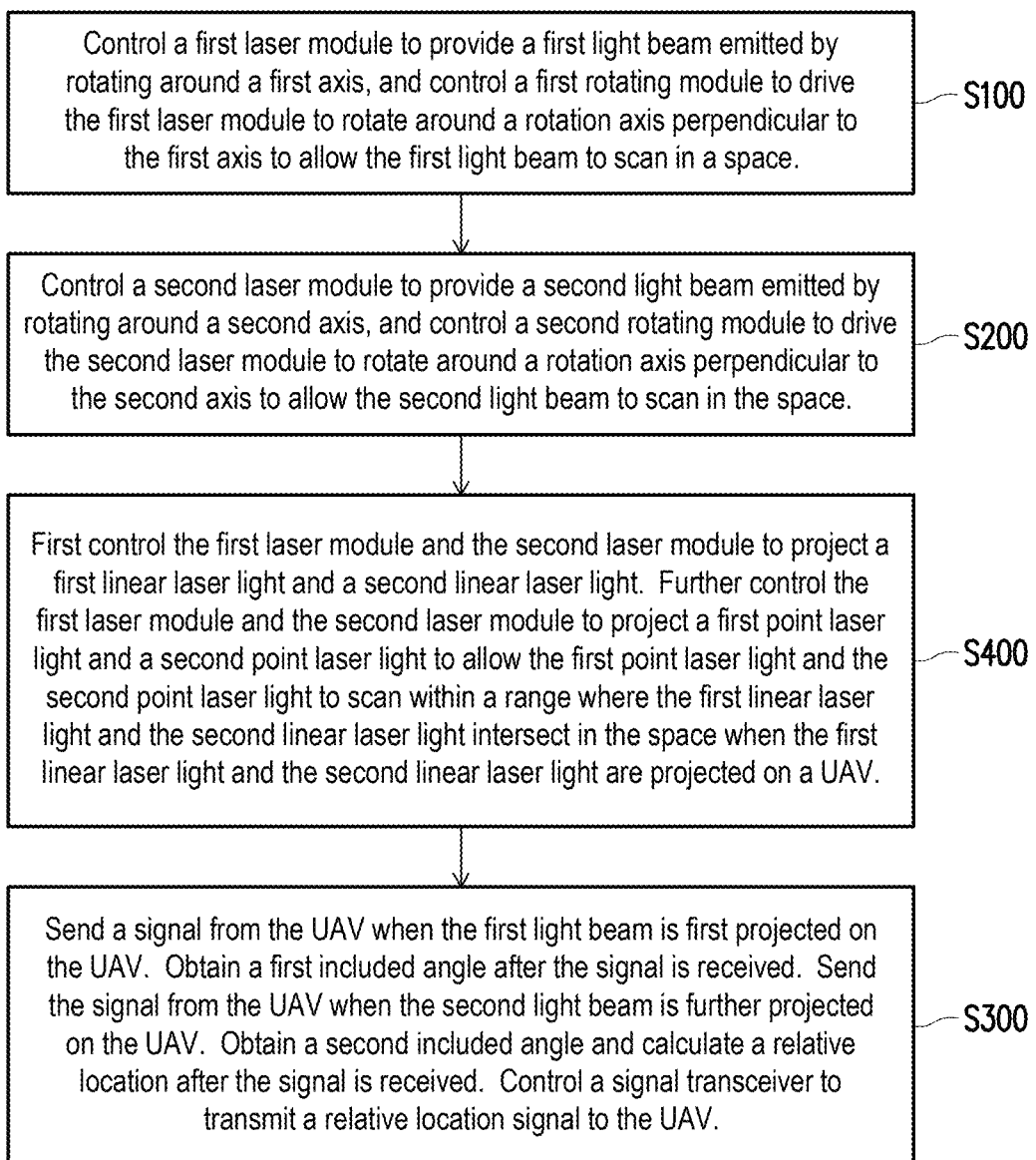

Control a first laser module to provide a first light beam emitted by rotating around a first axis, and control a first rotating module to drive the first laser module to rotate around a rotation axis perpendicular to the first axis to allow the first light beam to scan in a space.　　—S100

Control a second laser module to provide a second light beam emitted by rotating around a second axis, and control a second rotating module to drive the second laser module to rotate around a rotation axis perpendicular to the second axis to allow the second light beam to scan in the space.　　—S200

First control the first laser module and the second laser module to project a first linear laser light and a second linear laser light. Further control the first laser module and the second laser module to project a first point laser light and a second point laser light to allow the first point laser light and the second point laser light to scan within a range where the first linear laser light and the second linear laser light intersect in the space when the first linear laser light and the second linear laser light are projected on a UAV.　　—S400

Send a signal from the UAV when the first light beam is first projected on the UAV. Obtain a first included angle after the signal is received. Send the signal from the UAV when the second light beam is further projected on the UAV. Obtain a second included angle and calculate a relative location after the signal is received. Control a signal transceiver to transmit a relative location signal to the UAV.　　—S300

FIG. 11

Calculate a farthest distance based on the range where the first linear laser light and the second linear laser light intersect in the space when the first linear laser light and the second linear laser light are projected on the UAV.　　—S420

FIG. 12

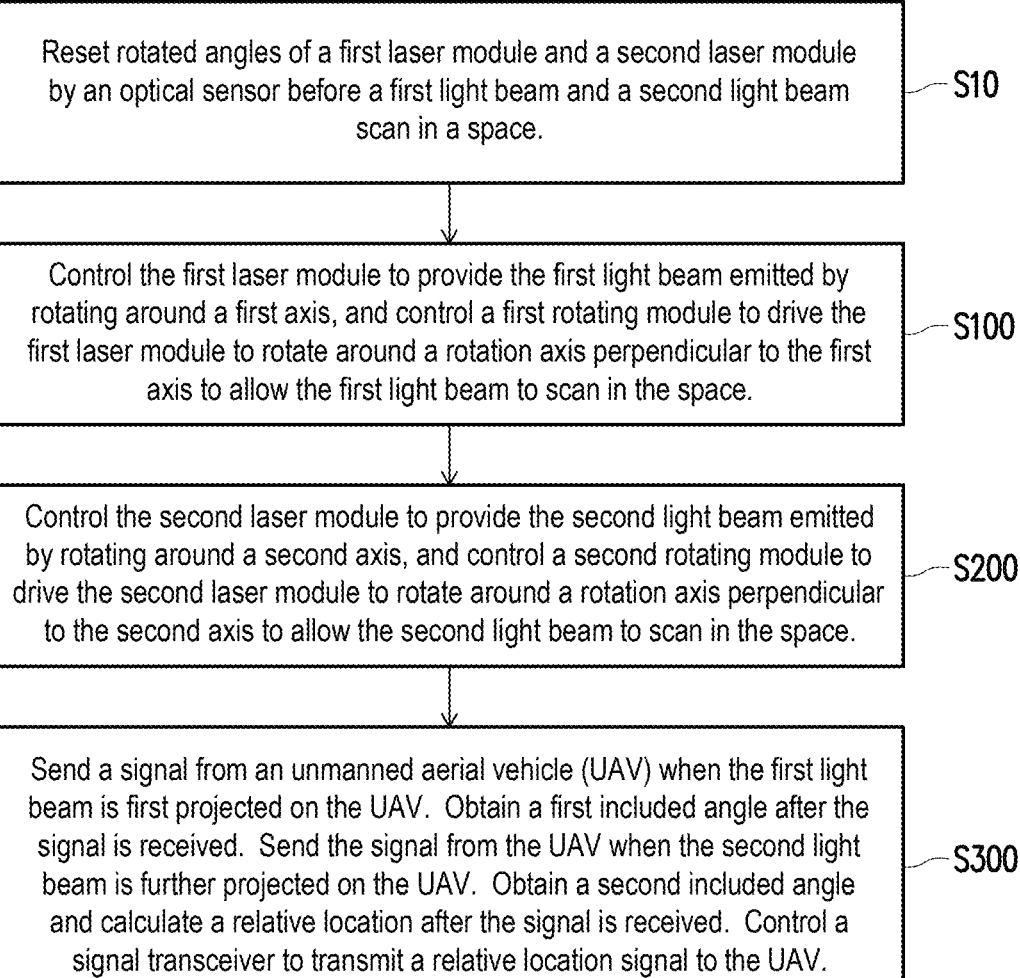

Further control the first laser module and the second laser module to switch to project the first linear laser light and the second linear laser light when the first laser module and the second laser module are controlled to project the first point laser light and the second point laser light to scan and have not sensed the location of the UAV.

Reset rotated angles of a first laser module and a second laser module by an optical sensor before a first light beam and a second light beam scan in a space.

S10

Control the first laser module to provide the first light beam emitted by rotating around a first axis, and control a first rotating module to drive the first laser module to rotate around a rotation axis perpendicular to the first axis to allow the first light beam to scan in the space.

S100

Control the second laser module to provide the second light beam emitted by rotating around a second axis, and control a second rotating module to drive the second laser module to rotate around a rotation axis perpendicular to the second axis to allow the second light beam to scan in the space.

S200

Send a signal from an unmanned aerial vehicle (UAV) when the first light beam is first projected on the UAV. Obtain a first included angle after the signal is received. Send the signal from the UAV when the second light beam is further projected on the UAV. Obtain a second included angle and calculate a relative location after the signal is received. Control a signal transceiver to transmit a relative location signal to the UAV.

DUAL SPINNING LASER-BASED UAV POSITIONING AND LANDING SYSTEM AND METHOD

CROSS-REFERENCE TO RELATED APPLICATION

This application claims the priority benefit of Taiwan application serial no. 113136272, filed on Sep. 25, 2024. The entirety of the above-mentioned patent application is hereby incorporated by reference herein and made a part of this specification.

BACKGROUND

Technical Field

The disclosure relates to a positioning and landing system and method, and in particular to a dual spinning laser-based unmanned aerial vehicle (UAV) positioning and landing system and method.

Description of Related Art

The purpose of a positioning guidance system used in an unmanned aerial vehicle (UAV) is to increase the effective positioning accuracy of the UAV to the size of an apron to allow the UAV to precisely land on the apron and start a charging process thereof. In other words, during a process of autonomous take-off, landing and charging of the UAV, the positioning guidance system needs to overcome a positioning error of a GPS to accurately position relative locations of the UAV and a charging pile.

Infrared imaging, for example, is used in current technology to achieve precise positioning. However, infrared image positioning requires the installation of an optical flow sensor and related image computing units on the UAV. Not only is the weight of the UAV increased, but the power consumption and cost are also increased. In addition, image data needs to be uploaded in advance in order to perform image recognition.

SUMMARY

The disclosure provides a dual spinning laser-based unmanned aerial vehicle (UAV) positioning and landing system and method that can provide precise positioning for an UAV.

An embodiment of the disclosure provides a dual spinning laser-based UAV positioning and landing system that includes a first laser module, a first rotating module, a second laser module, a second rotating module, a signal transceiver, a controller, and a substrate. The first laser module is configured to provide a first light beam emitted by rotating around a first axis. The first rotating module is connected with the first laser module and configured to drive the first laser module to rotate around a rotation axis perpendicular to the first axis to allow the first light beam to scan in a space. The second laser module is configured to provide a second light beam emitted by rotating around a second axis. The second rotating module is connected with the second laser module and configured to drive the second laser module to rotate around a rotation axis perpendicular to the second axis to allow the second light beam to scan in the space. The rotation axis perpendicular to the second axis and the rotation axis perpendicular to the first axis are parallel to each other. The controller is electrically connected to the first laser module, the first rotating module, the second laser module, the second rotating module and the signal transceiver. The first laser module, the first rotating module, the second laser module, the second rotating module, the signal transceiver and the controller are disposed on the substrate. When the first light beam is first projected on a UAV, the UAV sends a signal. After the signal transceiver receives the signal, the controller obtains a first included angle. When the second light beam is further projected on the UAV, the UAV sends the signal. After the signal transceiver receives the signal, the controller obtains a second included angle and calculates a relative location, and controls the signal transceiver to transmit a relative location signal to the UAV. The first included angle is an included angle between the first light beam and a connection line. The second included angle is an included angle between the second light beam and the connection line. The connection line is a connecting line between the first laser module and the second laser module. The relative location is a location of the UAV relative to a landing location on the substrate.

An embodiment of the disclosure provides a dual spinning laser-based UAV positioning and landing method that includes the following steps. A first laser module is controlled to provide a first light beam emitted by rotating around a first axis, and a first rotating module is controlled to drive the first laser module to rotate around a rotation axis perpendicular to the first axis to allow the first light beam to scan in a space. A second laser module is controlled to provide a second light beam emitted by rotating around a second axis, and a second rotating module is controlled to drive the second laser module to rotate around a rotation axis perpendicular to the second axis to allow the second light beam to scan in the space. A signal is sent from a UAV when the first light beam is first projected on the UAV. A first included angle is obtained after the signal is received. The signal is sent from the UAV when the second light beam is further projected on the UAV. A second included angle is obtained, and a relative location is calculated after the signal is received. A signal transceiver is controlled to transmit a relative location signal to the UAV.

Based on the above, in an embodiment of the disclosure, the dual spinning laser-based UAV positioning and landing system and method can precisely calculate the location of the UAV by installing the first laser module, the second laser module and the signal transceiver and by a method of triangulation to guide the UAV to land. Therefore, the dual spinning laser-based UAV positioning and landing system and method can perform precise landing and positioning to the UAV in a condition where the UAV only needs to install a laser receiver and a signal transceiver, that is, there are no special requirements for the hardware configuration and computing ability of the UAV itself.

BRIEF DESCRIPTION OF THE DRAWINGS

FIG. 8 is a flow chart of a dual spinning laser-based UAV positioning and landing method according to an embodiment of the disclosure.

FIG. 9 is a flow chart of emitting a first point laser light or a first linear laser light to scan in a space in a dual spinning laser-based UAV positioning and landing method according to an embodiment of the disclosure.

FIG. 10 is a flow chart of emitting a second point laser light or a second linear laser light to scan in a space in a dual spinning laser-based UAV positioning and landing method according to an embodiment of the disclosure.

FIG. 11 is a flow chart of first projecting a first linear laser light and a second linear laser light to scan and further projecting a first point laser light and a second point to scan in a dual spinning laser-based UAV positioning and landing method according to an embodiment of the disclosure.

FIG. 12 is a flow chart of further calculating a farthest distance in FIG. 11.

FIG. 13 is a flow chart of projecting a first point laser light and a second point laser light to scan and further projecting a first linear laser light and a second linear laser light to scan in a dual spinning laser-based UAV positioning and landing method according to an embodiment of the disclosure.

FIG. 14 is a flow chart of using an optical sensor to reset in a dual spinning laser-based UAV positioning and landing method according to an embodiment of the disclosure.

DESCRIPTION OF THE EMBODIMENTS

Figure 1A:
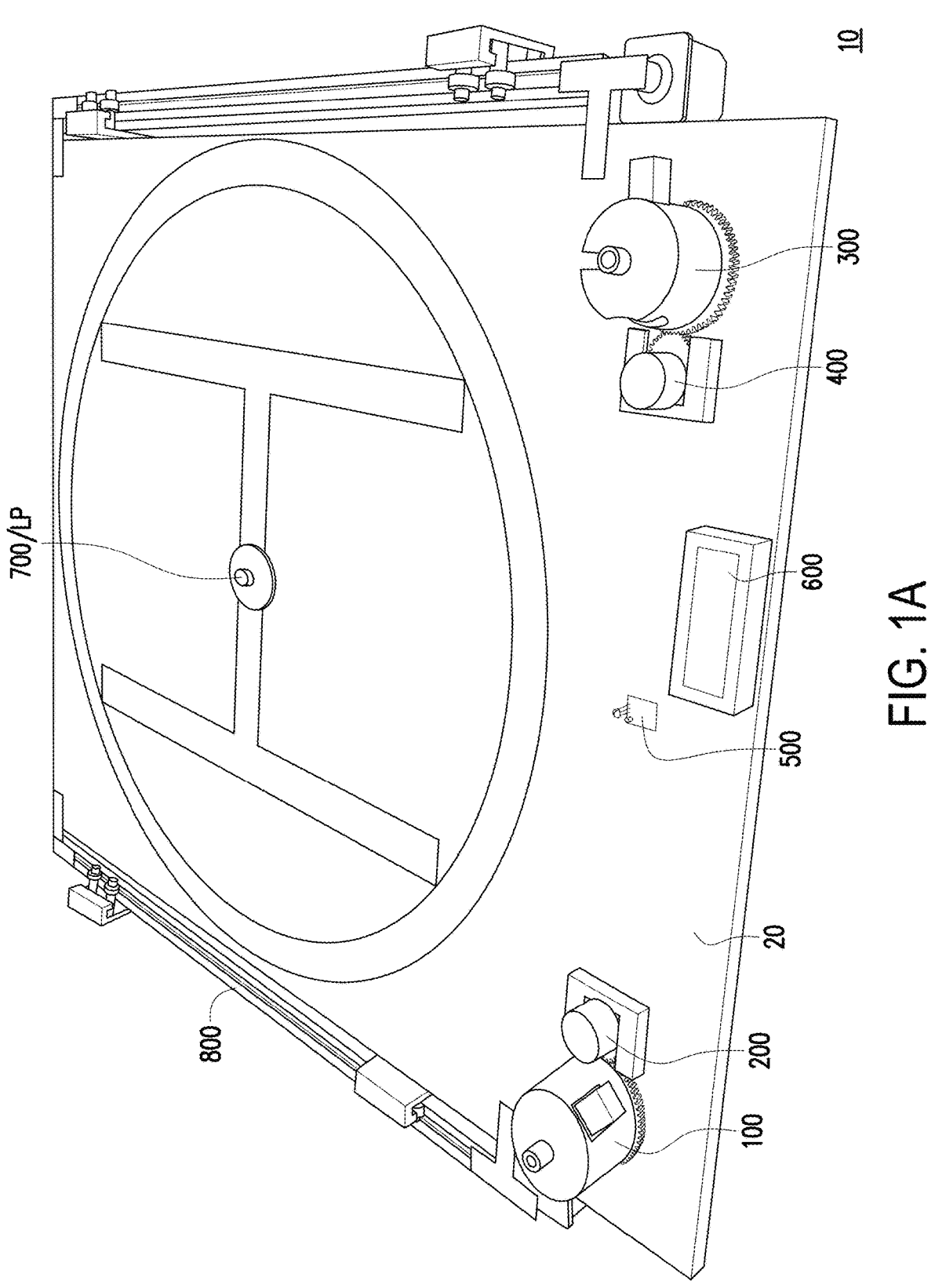
FIG. 1A is a schematic diagram of a dual spinning laser-based unmanned aerial vehicle (UAV) positioning and landing system according to an embodiment of the disclosure.
Figure 1B:
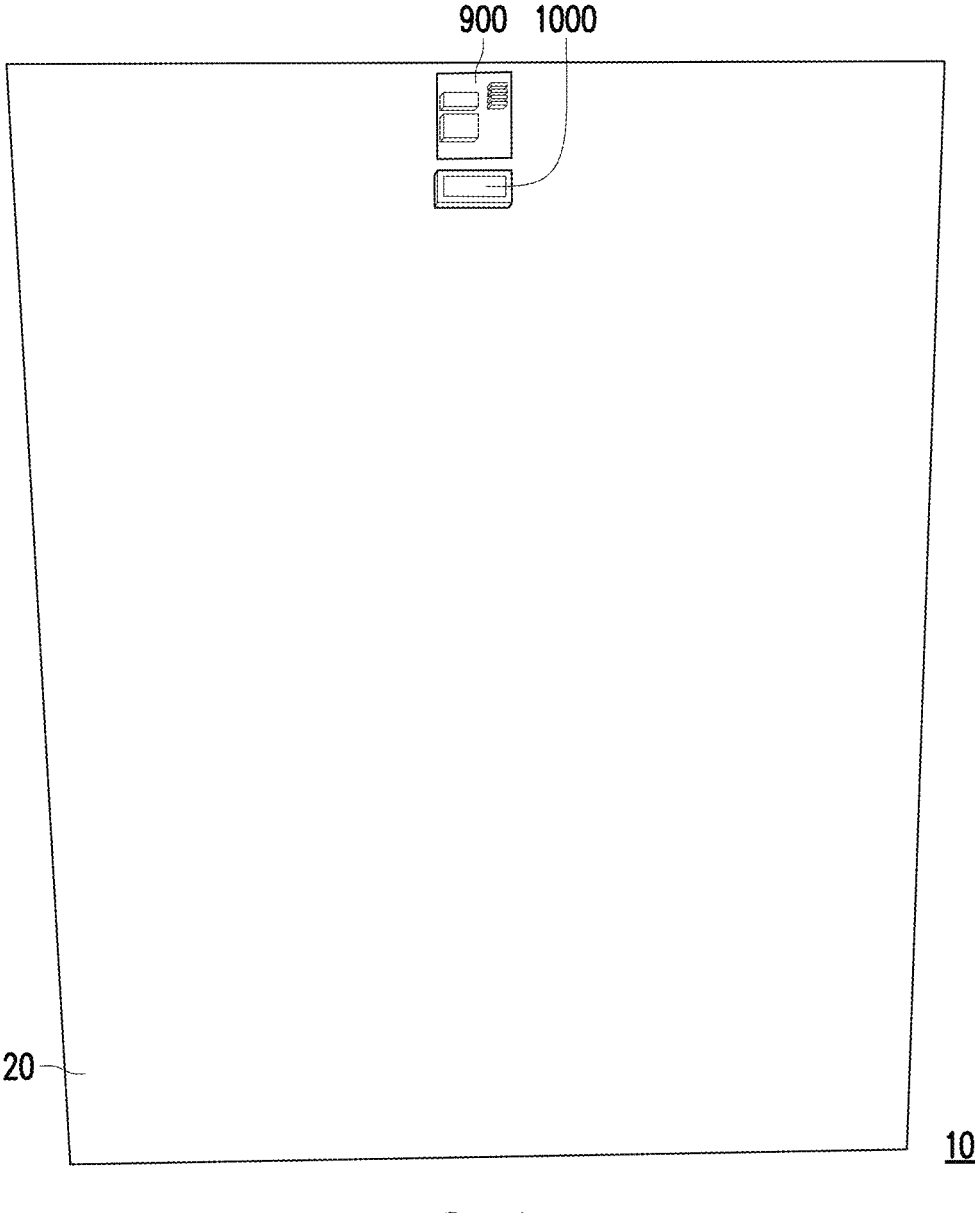
FIG. 1B is a schematic diagram of FIG. 1A on another side of the substrate.

FIG. 1A is a schematic diagram of a dual spinning laser-based unmanned aerial vehicle (UAV) positioning and landing system according to an embodiment of the disclosure. FIG. 1B is a schematic diagram of FIG. 1A on another side of the substrate. A location adjustment module 800 in FIG. 1A is omitted in FIG. 1B. Please refer to FIG. 1A and FIG. 1B. An embodiment of the disclosure provides a dual spinning laser-based UAV positioning and landing system 10 that includes a first laser module 100, a first rotating module 200, a second laser module 300, a second rotating module 400, a signal transceiver 1000, a controller 900, and a substrate 20.

In the embodiment, the substrate 20 is, for example, designed as an apron for a UAV. The first laser module 100, the first rotating module 200, the second laser module 300, the second rotating module 400, the signal transceiver 1000 and the controller 900 are disposed on the substrate 20. The first laser module 100, the first rotating module 200, the second laser module 300 and the second rotating module 400 are disposed on one side of the substrate 20 as shown in FIG. 1A, and the signal transceiver 1000 and the controller 900 are disposed on another side of the substrate 20 opposite from the first laser module 100 as shown in FIG. 1B.

Figure 2:
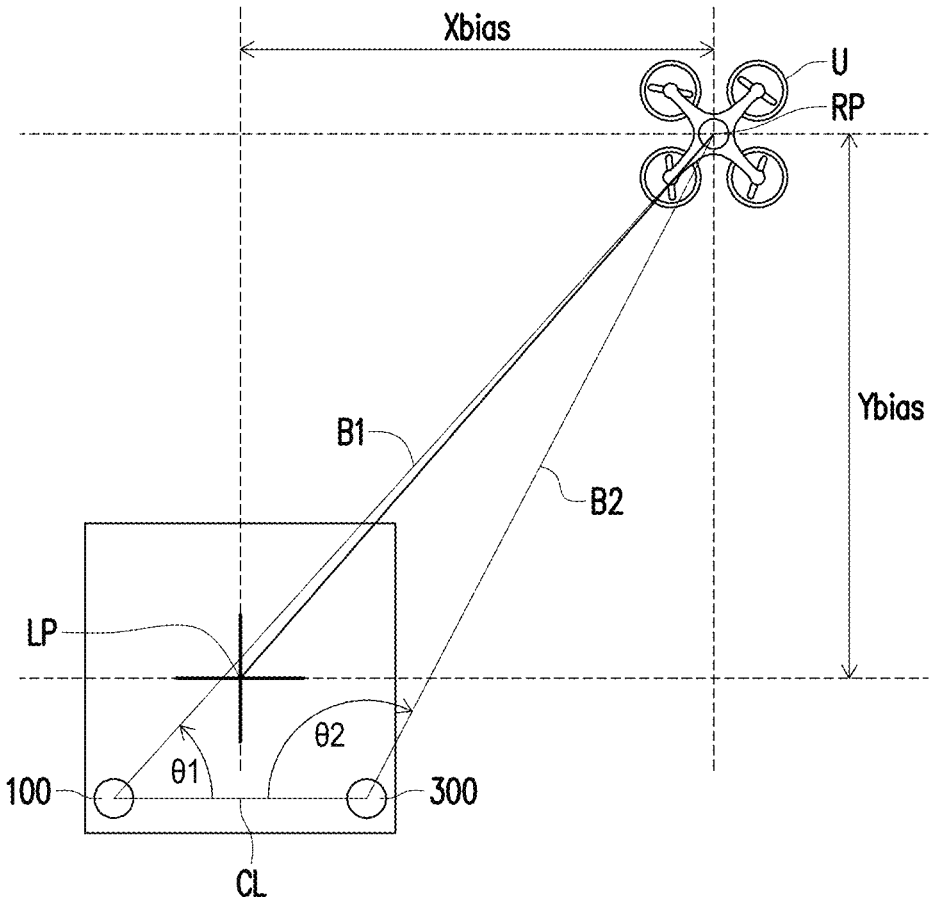
FIG. 2 is a schematic diagram of a dual spinning laser-based UAV positioning and landing system calculating a first included angle, a second included angle and a relative location according to an embodiment of the disclosure.

FIG. 2 is a schematic diagram of a dual spinning laser-based UAV positioning and landing system calculating a first included angle, a second included angle and a relative location according to an embodiment of the disclosure. Please refer to FIG. 1A to FIG. 2. In the embodiment, the first laser module 100 is configured to provide a first light beam B1 emitted by rotating around a first axis. The first rotating module 200 is connected with the first laser module 100 and configured to drive the first laser module 100 to rotate around a rotation axis perpendicular to the first axis to allow the first light beam B1 to scan in a space. The second laser module 300 is configured to provide a second light beam B2 emitted by rotating around a second axis. The second rotating module 400 is connected with the second laser module 300 and configured to drive the second laser module 300 to rotate around a rotation axis perpendicular to the second axis to allow the second light beam B2 to scan in the space. The rotation axis perpendicular to the second axis and the rotation axis perpendicular to the first axis are parallel to each other. The first rotating module 200 or the second rotating module 400 may be a stepper motor. The foregoing rotation around the first axis or the rotation around the second axis takes, for example, a plane extending from the substrate 20 to be a ground plane and is performed along an elevation angle. That is to say, the first axis and the second axis are parallel to the substrate 20. The foregoing first laser module 100 being driven to rotate around the rotation axis perpendicular to the first axis and the second laser module 300 being driven to rotate around the rotation axis perpendicular to the second axis take, for example, the plane extending from the substrate 20 to be the ground plane and rotate along the elevation angle. That is to say, the rotation axis of the first laser module 100 and the rotation axis of the second laser module 300 are perpendicular to the substrate 20. In addition, preferably the first laser module 100 may be controlled to rotate clockwise, and the second laser module 300 may be controlled to rotate counterclockwise; alternatively, the first laser module 100 may be controlled to rotate counterclockwise, and the second laser module 300 may be controlled to rotate clockwise, but the disclosure is not limited thereto.

In the embodiment, the controller 900 includes, for example, a central processing unit (CPU), a microprocessor, a digital signal processor (DSP), a programmable controller, and a programmable logic device (PLD), a graphic processing unit (GPU), or other similar devices or a combination of the devices (such as Arduino), and the disclosure is not limited thereto. In addition, in an embodiment, each function of the controller 900 may be implemented as one or multiple program codes. The program codes may be stored in a memory unit and executed by the controller 900. Alternatively, in an embodiment, each function of the controller 900 may be implemented as one or multiple circuits. The disclosure is not limited to using software or hardware to implement each function of the controller 900.

In the embodiment, the signal transceiver 1000 is, for example, a radio frequency (RF) wireless communication module, but the disclosure is not limited thereto.

In the embodiment, the controller 900 is electrically connected to the first laser module 100, the first rotating module 200, the second laser module 300, the second rotating module 400, and the signal transceiver 1000. When the first light beam B1 is projected on an unmanned aerial vehicle (UAV) U, the UAV U sends out a signal. After the signal transceiver 1000 receives the signal, the controller 900 obtains a first included angle θ1. When the second light beam B2 is projected on the UAV U, the UAV U sends out the signal. After the signal transceiver 1000 receives the signal, the controller 900 obtains a second included angle θ2 and calculates a relative location RP, and controls the signal transceiver 1000 to transmit a relative location signal to the UAV U. The first included angle θ1 is an included angle between the first light beam B1 and a connection line CL (projected on a plane extending from the substrate 20). The second included angle θ2 is an included angle between the second light beam B2 and the connection line CL (projected on the plane extending from the substrate 20). The connection line CL is a connecting line between the first laser module 100 and the second laser module 300. The relative location RP is a location of the UAV U relative to a landing location LP on the substrate 20.

Figure 3A:
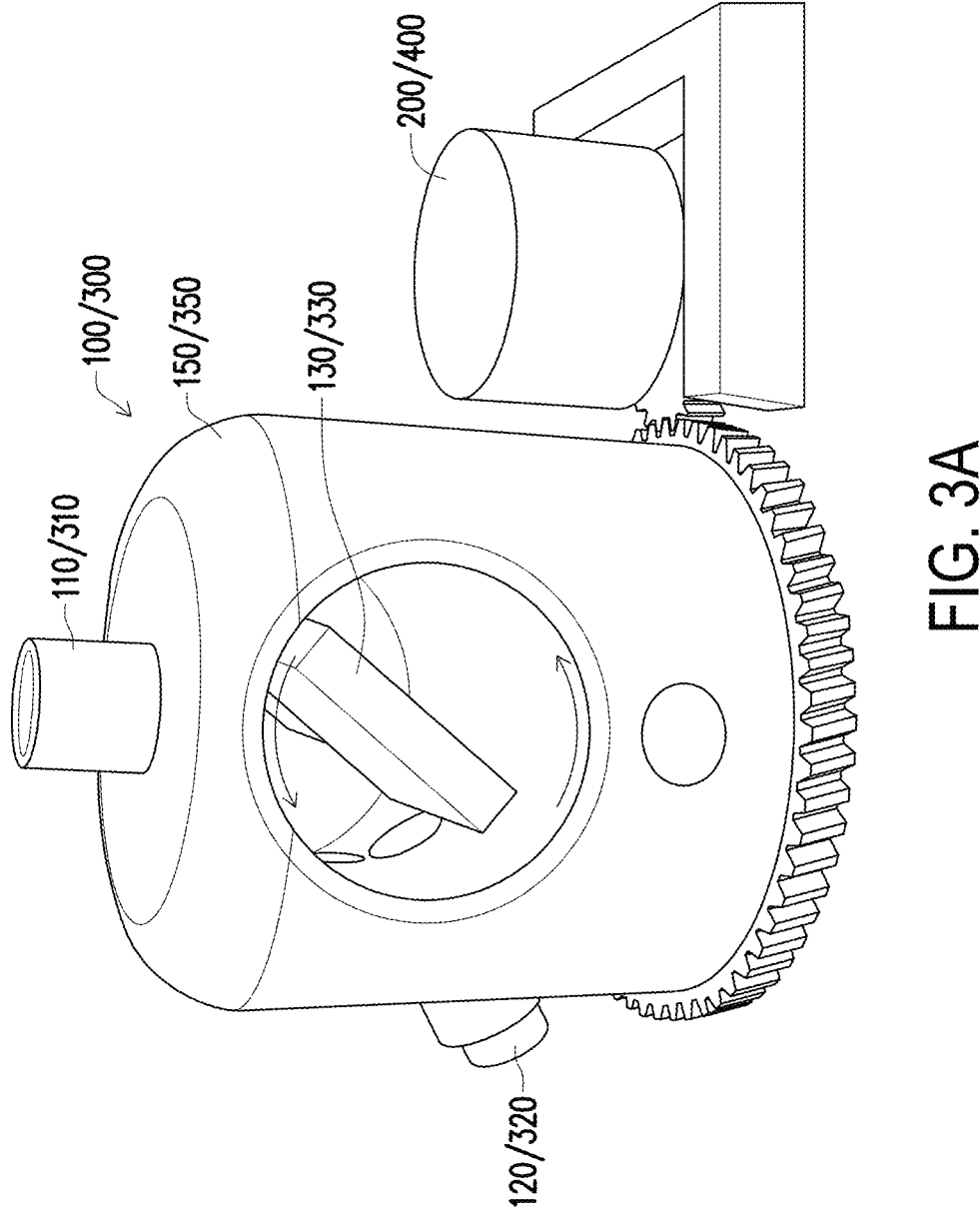
FIG. 3A is a schematic diagram of the first laser module or the second laser module in FIG. 1A.

That is to say, when the first light beam B1 hits the UAV U, a signal transceiver (such as a RF wireless communication module) on the UAV U transmits the signal to the signal transceiver 1000 on the substrate 20 to notify the controller 900 to record the first included angle θ1. Next, the controller 900 further controls the second laser module 300 to project the second light beam B2 in a dual-spin (a rotation of a second reflector 330 in the second laser module 300 and the rotation of the second laser module 300 driven by the second rotating module 400 as shown in FIG. 3A) manner to scan. After the second light beam B2 hits the UAV U, the signal transceiver on the UAV U transmits the signal to the signal transceiver 1000 on the substrate 20 to notify the controller 900 to record the second included angle θ2. Therefore, the two laser modules do not operate at the same time to avoid interference from each other and cause misjudgment of the system. Finally, through the first included angle θ1 and the second included angle θ2, triangulation is used to calculate the relative location RP, and the relative location signal is transmitted to the UAV U. The relative location RP includes an X-axis offset Xbias and a Y-axis offset Ybias. A distance between the relative location RP and the landing location LP on the plane formed parallel to the substrate 20 is a GPS error of the UAV U at this point in time. Therefore, the UAV U may fly toward the landing location LP based on the X-axis offset Xbias and the Y-axis offset Ybias, and further vertically land along a Z-axis at the landing location LP.

Figure 3B:
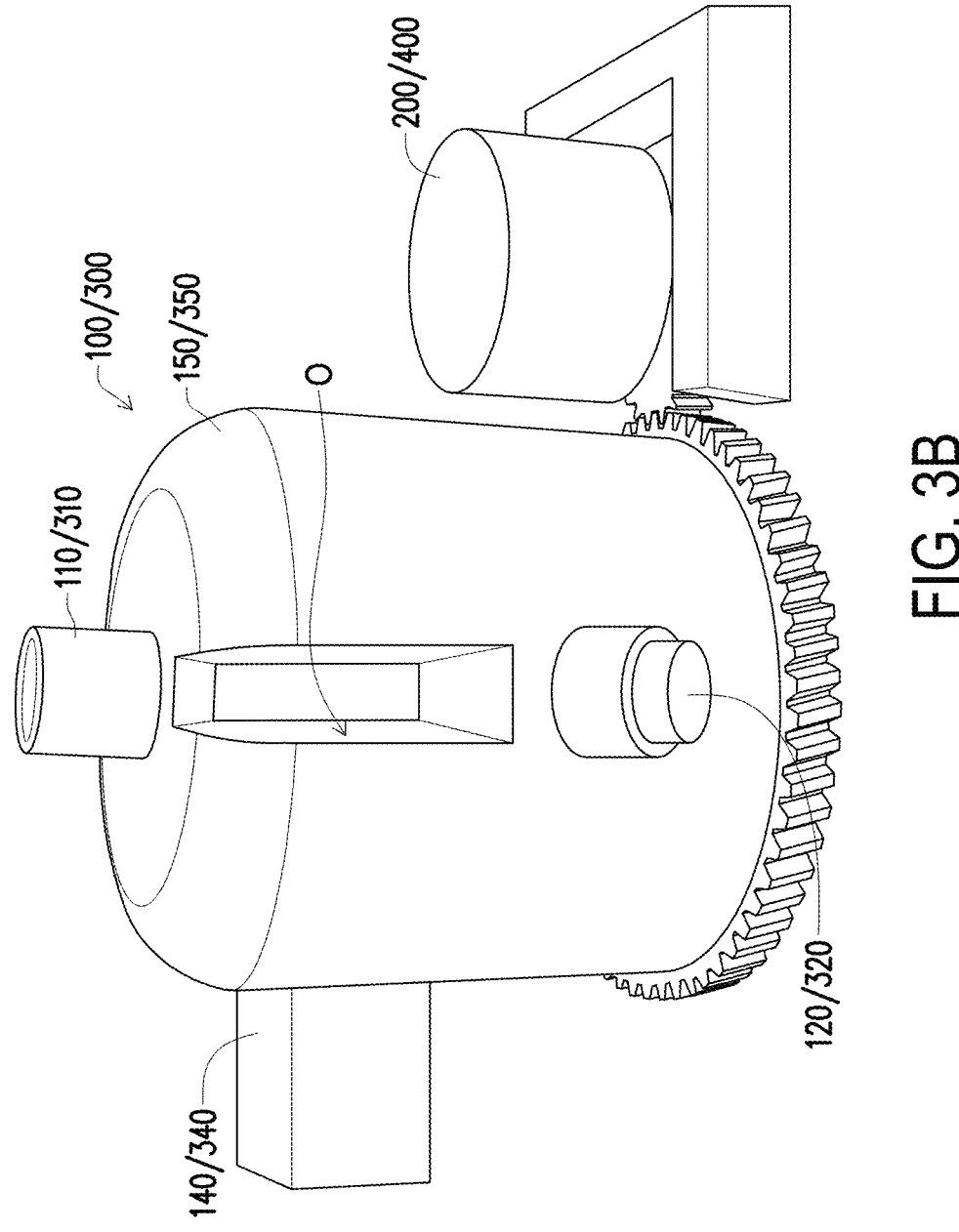
FIG. 3B is a schematic view of FIG. 3A on another side.
Figure 4B:
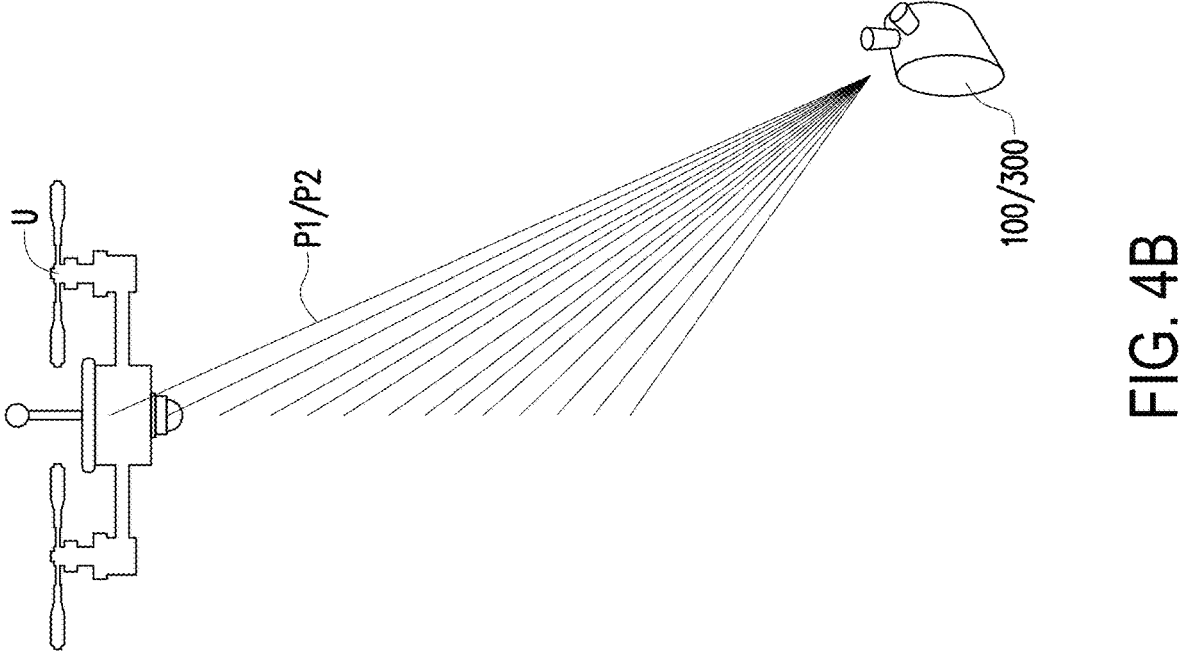
FIG. 4B is a schematic diagram of the first laser module emitting a first point laser light or the second laser module emitting a second point laser light to scan in the space in FIG. 1A.
Figure 4A:
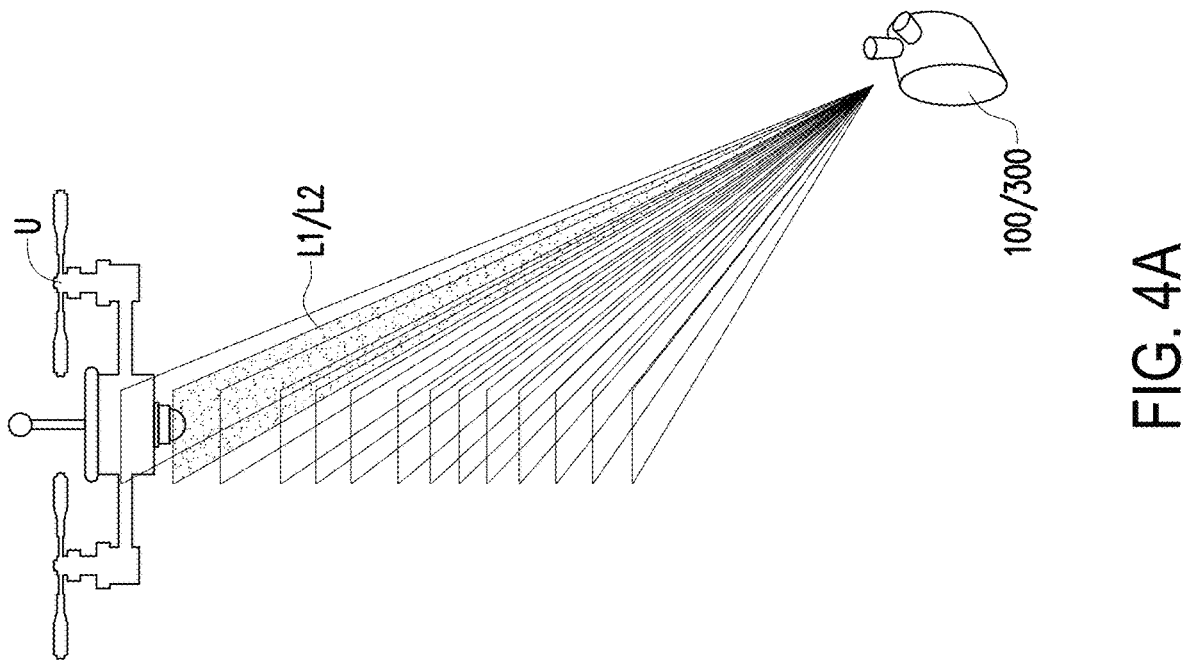
FIG. 4A is a schematic diagram of the first laser module emitting a first linear laser light or the second laser module emitting a second linear laser light to scan in the space in FIG. 1A.

FIG. 3A is a schematic diagram of the first laser module or the second laser module in FIG. 1A. FIG. 3B is a schematic view of FIG. 3A on another side. FIG. 4A is a schematic diagram of the first laser module emitting a first linear laser light or the second laser module emitting a second linear laser light to scan in the space in FIG. 1A. FIG. 4B is a schematic diagram of the first laser module emitting a first point laser light or the second laser module emitting a second point laser light to scan in the space in FIG. 1A. Please refer to FIG. 3A to FIG. 4B. Specifically, in the embodiment, the first light beam B1 includes a first point laser light P1 and a first linear laser light L1. The first laser module 100 includes a shell 150, a first light source 110, a second light source 120, a first reflector 130, and a first rotator 140. The first light source 110, the second light source 120 and the first rotator 140 are embedded on the shell 150, and the first reflector 130 is disposed in the shell 150.

In the embodiment, the first light source 110 is, for example, a point laser emitter. The first light source 110 is configured to emit the first point laser light P1. The second light source 120 is, for example, a line laser emitter. The second light source 120 is configured to emit the first linear laser light L1. The first point laser light P1 or the first linear laser light L1 is, for example, a red light, but the disclosure is not limited thereto. The first reflector 130 is disposed on optical paths of the first point laser light P1 and the first linear laser light L1 and configured to project the first point laser light P1 and the first linear laser light L1 out of the first laser module 100. The first rotator 140 is, for example, a direct current motor, but the disclosure is not limited thereto. The first rotator 140 is connected with the first reflector 130 to drive the first reflector 130 to rotate around the first axis to allow the first point laser light P1 or the first linear laser light L1 to scan in the space.

Similarly, in the embodiment, the second light beam B2 includes a second point laser light P2 and a second linear laser light L2. The second laser module 200 includes a shell 350, a third light source 310, a fourth light source 320, a second reflector 330, and a second rotator 340. The third light source 310, the fourth light source 320 and the second rotator 340 are embedded on the shell 350, and the second reflector 330 is disposed in the shell 350.

In the embodiment, the third light source 310 is, for example, a point laser emitter. The third light source 310 is configured to emit the second point laser light P2. The fourth light source 320 is, for example, a line laser emitter. The fourth light source 320 is configured to emit the second linear laser light L2. The second point laser light P2 or the second linear laser light L2 is, for example, a red light, but the disclosure is not limited thereto. The second reflector 330 is disposed on optical paths of the second point laser light P2 and the second linear laser light L2 and configured to project the second point laser light P2 and the second linear laser light L2 out of the second laser module 300. The second rotator 340 is, for example, a direct current motor. The second rotator 340 is connected with the second reflector 330 to drive the second reflector 330 to rotate around the second axis to allow the second point laser light P2 or the second linear laser light L2 to scan in the space. In addition, when the first reflector 130 rotates to allow the first point laser light P1 and the first linear laser light L1 to scan in the space, and the second reflector 330 rotates to allow the second point laser light P2 and the second linear laser light L2 to scan in the space, as shown in FIG. 4A and FIG. 4B, the scanning trajectory forms a plane perpendicular to a horizontal plane in the space. Therefore, the first rotating module 200 and the second rotating module 400 are further used to respectively drive the first laser module 100 and the second laser module 300 to rotate to allow the first point laser light P1, the first linear laser light L1, the second point laser light P2 and the second linear laser light L2 to completely scan the entire space.

Figure 5:
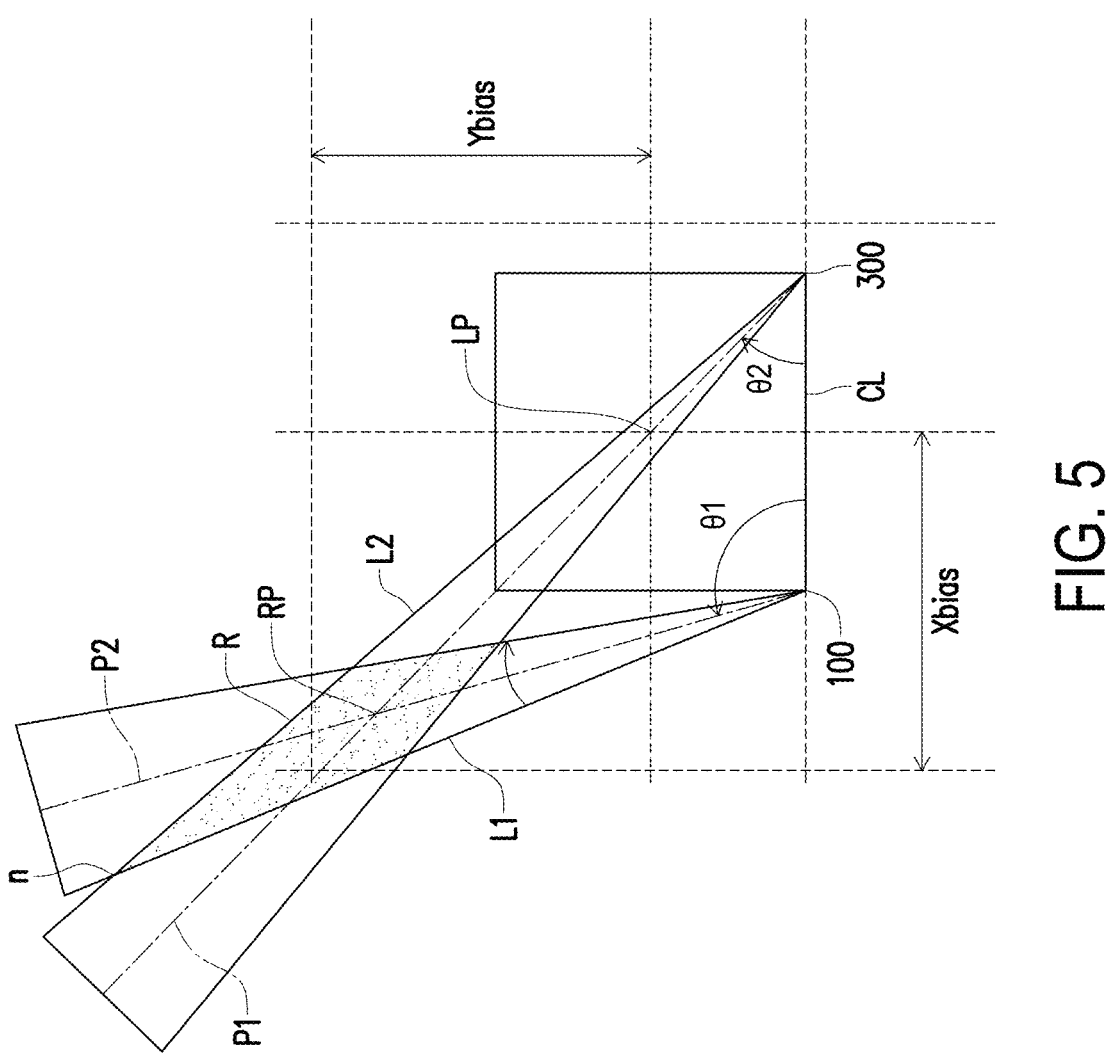
FIG. 5 is a schematic diagram of a first point laser light and a second point laser light scanning within a range where a first linear laser light and a second linear laser light intersect in a space in a dual spinning laser-based UAV positioning and landing system according to an embodiment of the disclosure.

FIG. 5 is a schematic diagram of a first point laser light and a second point laser light scanning within a range where a first linear laser light and a second linear laser light intersect in a space in a dual spinning laser-based UAV positioning and landing system according to an embodiment of the disclosure. Please refer to FIG. 5. In the embodiment, the controller 900 for example, first controls the first laser module 100 and the second laser module 300 to project the first linear laser light L1 and the second linear laser light L2.

After the first linear laser light L1 and the second linear laser light L2 are projected on the UAV U, a possible range of the location of the UAV is first calculated, and the first laser module 100 and the second laser module 300 are further controlled to project the first point laser light P1 and the second point laser light P2 to allow the first point laser light P1 and the second point laser light P2 to scan within a range R where the first linear laser light L1 and the second linear laser light L2 intersect in the space. That is to say, when the first linear laser light L1 and the second linear laser light L2 are projected to sense the UAV U, the possible location of the UAV U may be reduced within the range R. The first point laser light P1 and the second point laser light P2 are further switched to be projected to scan to more accurately obtain the location of the UAV U.

In another embodiment, the controller 900 controls the first laser module 100 and the second laser module 300 to project the first point laser light P1 and the second point laser light P2 to scan and have not sensed the position of the UAV U, and further controls the first laser module 100 and the second laser module 300 to switch to project the first linear laser light L1 and the second linear laser light L2. That is to say, the controller 900 may switch to project the first point laser light P1 and the second point laser light P2 or project the first linear laser light L1 and the second linear laser light L2 according to scanning conditions.

Figure 6:
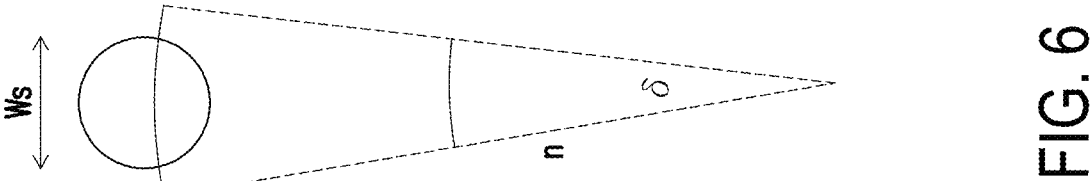
FIG. 6 is a schematic diagram of a first point laser light or a second point laser light scanning a pitch angle in a space in a dual spinning laser-based UAV positioning and landing system according to an embodiment of the disclosure.

FIG. 6 is a schematic diagram of a first point laser light or a second point laser light scanning a pitch angle in a space in a dual spinning laser-based UAV positioning and landing system according to an embodiment of the disclosure. Please refer to FIG. 6. In the embodiment, as previously mentioned, the first laser module 100 and the second laser module 300 are first controlled to project the first linear laser light L1 and the second linear laser light L2. When the first linear laser light L1 and the second linear laser light L2 are projected on the UAV U, the controller 900 calculates a farthest distance n (that is, a distance farthest from the landing location LP within the range R) based on the range R where the first linear laser light L1 and the second linear laser light L2 intersect in the space. Moreover, the dual spinning laser-based UAV positioning and landing system 10 preferably satisfies:

$$\delta \le \arctan(Ws/n) \times (180/\pi),$$

where $\delta$ is a pitch angle (that is, an included angle of a laser light scan from a previous or next scan in the space) of the first point laser light P1 or the second point laser light P2 scan in the space. Ws is a width of the sensor/signal transceiver on the UAV U, and n is the farthest distance.

For example, taking the GPS error of about 10 m (that is, an error between the location of the UAV U and the landing location LP) as the farthest distance n and the width of the sensor on the UAV U as 0.004 m, $\delta \le 0.0229$ degrees may be calculated. Therefore, when $\delta \le 0.0229$ degrees is satisfied, a condition of missing the UAV U when the first point laser light P1 and the second point laser light P2 are used to scan may be avoided. Furthermore, since the farthest distance n is smaller, the pitch angle $\delta$ may be set larger. Therefore, after a linear laser light is first used to scan to find out the possible range R of the UAV U, the pitch angle $\delta$ of a point laser light scan may be set higher to shorten the scan time of the system. For example, it takes several hours for a point laser light to finish scanning the entire space, but in the embodiment, it only takes several minutes to finish scanning the entire space.

Please refer to FIG. 1A again. In the embodiment, the dual spinning laser-based UAV positioning and landing system 10 further includes an optical sensor 500. The optical sensor 500 is, for example, a laser optical sensor, a photodiode or other sensors. The optical sensor 500 is disposed on the substrate 20 and between the first laser module 100 and the second laser module 300 (and is disposed on the connection line CL as shown in FIG. 2), electrically connected with the controller 900, and configured to allow the controller 900 to reset rotated angles of the first laser module 100 and the second laser module 300 by the optical sensor 500 before the first light beam B1 and the second light beam B2 scan in the space. For example, the first laser module 100 is allowed to rotate counterclockwise, and the second laser module 300 is allowed to rotate clockwise. When the optical sensor 500 senses the signal of the first light beam B1, the first included angle θ1 is 0. When the optical sensor 500 senses the signal of the second light beam B2, the second included angle θ2 is 0.

In the embodiment, the dual spinning laser-based UAV positioning and landing system 10 further includes a display module 600. The display module 600 is, for example, a liquid-crystal display (LCD), an organic light-emitting diode (OLED) display, an electrophoretic display (EPD), or other suitable displays. The display module 600 is disposed on the substrate 20, electrically connected with the controller 900, and configured to display the operation status of the dual spinning laser-based UAV positioning and landing system 10.

In an embodiment, the dual spinning laser-based UAV positioning and landing system 10 further includes a location adjustment module 800. The location adjustment module 800 is disposed on the substrate 20, electrically connected to the controller 900, and configured to clamp the UAV U and move the location of the UAV U to the landing location LP after the UAV U lands. For example, the location adjustment module 800 may include a slide rail, a clamper, and a stepper motor. The clamper is disposed on the slide rail, and the location may be adjusted by the stepper motor.

Figure 7A:
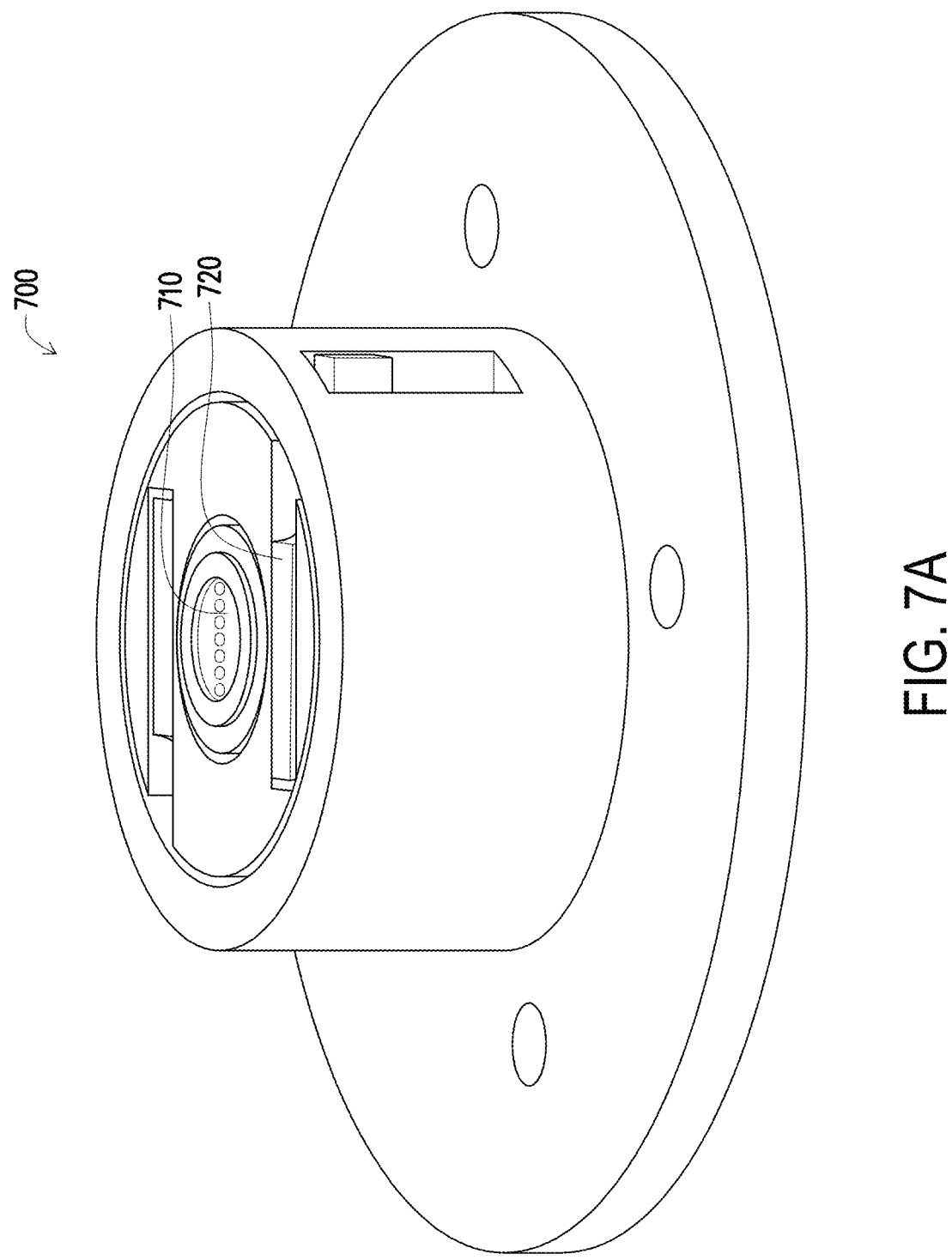
FIG. 7A is a schematic diagram of the charging module in FIG. 1A.
Figure 7B:
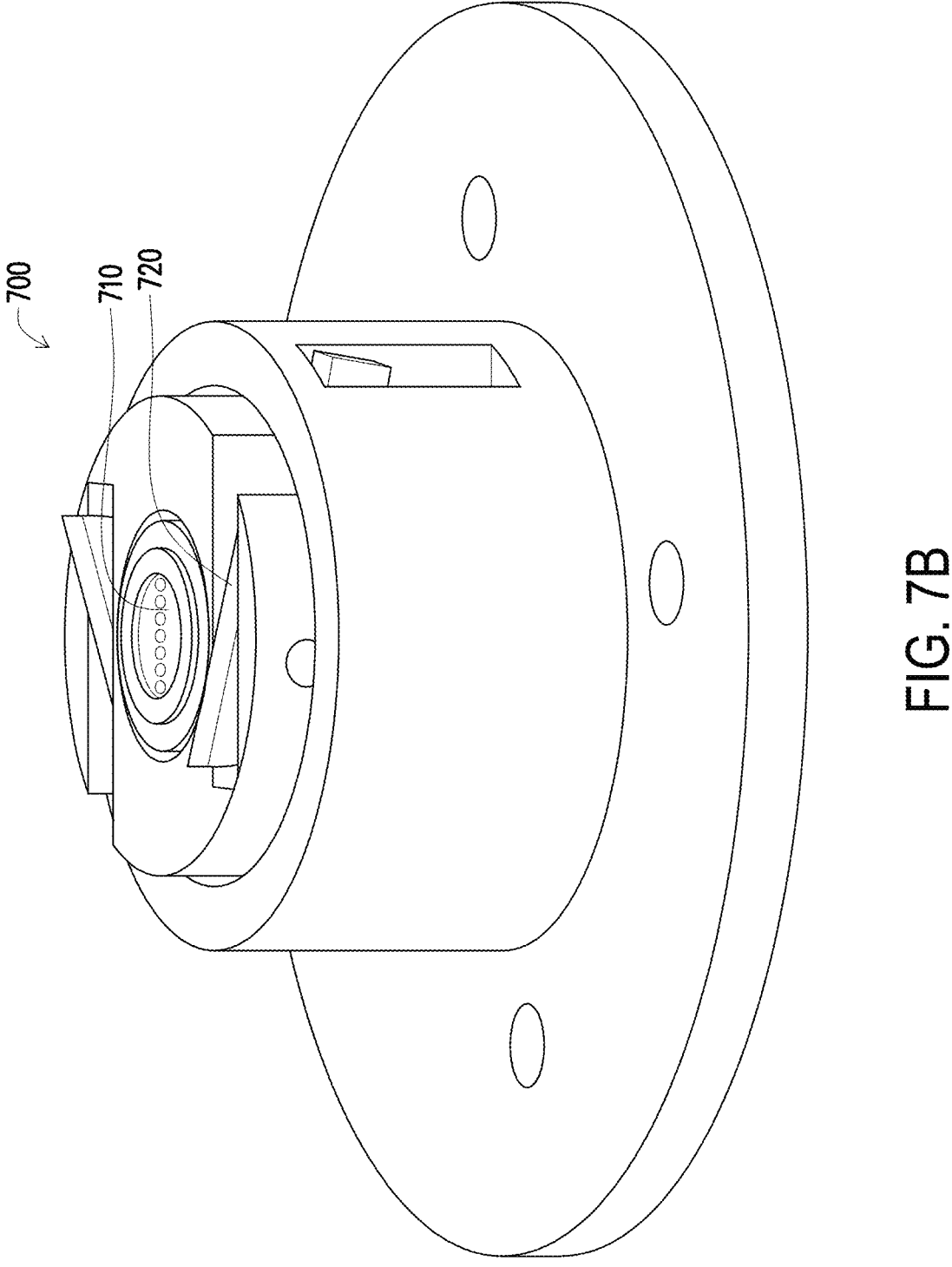
FIG. 7B is a schematic diagram of the lever assisting the UAV to break away from the magnetic charging interface in FIG. 7A.

FIG. 7A is a schematic diagram of the charging module in FIG. 1A. FIG. 7B is a schematic diagram of the lever assisting the UAV to break away from the magnetic charging interface in FIG. 7A. Please refer to FIG. 1, FIG. 7A, and FIG. 7B. In the embodiment, the dual spinning laser-based UAV positioning and landing system 10 further includes a charging module 700. The charging module 700 is disposed at the landing location LP and electrically connected with the controller 900. The charging module 700 includes a magnetic charging interface 710 and a lever 720. The magnetic charging interface 710 is configured to attach to the UAV U when the UAV U lands. The lever 720 is disposed around the magnetic charging interface 710 to assist the UAV U to break away from the magnetic charging interface 710 when the UAV U takes off. For example, as shown in FIG. 7B, when the UAV U takes off, the magnetic charging interface 710 rises relative to the substrate 20 as the UAV U takes off. At the same time, as the magnetic charging interface 710 rises, the lever 720 is affected by other mechanical components of the charging module 700 and protrudes from a plane extending from the magnetic charging interface 710 to allow the UAV U to break away from the magnetic charging interface 710.

FIG. 8 is a flow chart of a dual spinning laser-based UAV positioning and landing method according to an embodiment of the disclosure. Please refer to FIG. 8. An embodiment of the disclosure provides a dual spinning laser-based UAV positioning and landing method that includes the following steps. In step S100, the first laser module 100 is controlled to provide the first light beam B1 emitted by rotating around a first axis, and the first rotating module 200 is controlled to drive the first laser module 100 to rotate around a rotation axis perpendicular to the first axis to allow the first light beam B1 to scan in a space. (When the first light beam B1 hits the UAV U, the UAV U may send a signal to the signal transceiver 1000 to notify the first included angle θ1.) In step S200, the second laser module 300 is controlled to provide the second light beam B2 emitted by rotating around a second axis, and the second rotating module 400 is controlled to drive the second laser module 300 to rotate around a rotation axis perpendicular to the second axis to allow the second light beam B2 to scan in the space. In step S300, the first light beam B1 is first projected on the UAV U, the second light beam B2 is further projected on the UAV U, and the signal is sent from the UAV U. After the signal is received, the controller 900 receives the second included angle θ2, the relative location RP is calculated by the information of the first included angle θ1 and the second included angle θ2 previously obtained, and the signal transceiver 1000 is controlled to transmit a relative location signal to the UAV U.

FIG. 9 is a flow chart of emitting a first point laser light or a first linear laser light to scan in a space in a dual spinning laser-based UAV positioning and landing method according to an embodiment of the disclosure. Please refer to FIG. 9. In the embodiment, the foregoing step S100 includes the following steps. In step S120, the first light source 110 is controlled to emit the first point laser light P1, the second light source 120 is controlled to emit the first linear laser light L1, and the first rotator 140 is controlled to drive the first reflector 130 to rotate around the first axis to allow the first point laser light P1 or the first linear laser light L1 to scan in the space.

FIG. 10 is a flow chart of emitting a second point laser light or a second linear laser light to scan in a space in a dual spinning laser-based UAV positioning and landing method according to an embodiment of the disclosure. Please refer to FIG. 10. In the embodiment, the foregoing step S200 includes the following steps. In step S220, the third light source 310 is controlled to emit the second point laser light P2, the fourth light source 320 is controlled to emit the second linear laser light L2, and the second rotator 340 is controlled to drive the second reflector 330 to rotate around the second axis to allow the second point laser light P2 or the second linear laser light L2 to scan in the space.

FIG. 11 is a flow chart of first projecting a first linear laser light and a second linear laser light to scan and further projecting a first point laser light and a second point to scan in a dual spinning laser-based UAV positioning and landing method according to an embodiment of the disclosure. Please refer to FIG. 11. In the embodiment, the dual spinning laser-based UAV positioning and landing method further includes the following steps. In step S400, the first laser module 100 and the second laser module 300 are first controlled to project the first linear laser light L1 and the second linear laser light L2. When the first linear laser light L1 and the second linear laser light L2 are projected on the UAV U, the first laser module 100 and the second laser module 300 are further controlled to project the first point laser light P1 and the second point laser light P2 to allow the first point laser light P1 and the second point laser light P2 to scan within the range R where the first linear laser light L1 and the second linear laser light L2 intersect in the space.

FIG. 12 is a flow chart of further calculating a farthest distance in FIG. 11. Please refer to FIG. 12. In the embodiment, the foregoing step S400 includes the following steps. In step S420, when the first linear laser light L1 and the second linear laser light L2 are projected on the UAV U, the farthest distance n is calculated based on the scope R where the first linear laser light L1 and the second linear laser light L2 intersect in the space.

FIG. 13 is a flow chart of projecting a first point laser light and a second point laser light to scan and further projecting a first linear laser light and a second linear laser light to scan in a dual spinning laser-based UAV positioning and landing method according to an embodiment of the disclosure. Please refer to FIG. 13. In another embodiment, the dual spinning laser-based UAV positioning and landing method further includes the following steps. In step S500, when the first laser module 100 and the second laser module 300 are controlled to project the first point laser light P1 and the second point laser light P2 to scan and have not sensed the location of the UAV, the first laser module 100 and the second laser module are further controlled to switch to project the first linear laser light L1 and the second linear laser light L2.

FIG. 14 is a flow chart of using an optical sensor to reset in a dual spinning laser-based UAV positioning and landing method according to an embodiment of the disclosure. Please refer to FIG. 14. In the embodiment, the dual spinning laser-based UAV positioning and landing method further includes the following steps. In step S10, rotated angles of the first laser module 100 and the second laser module 300 are reset by the optical sensor 500 before the first light beam B1 and the second light beam B2 scan in the space.

In summary, in the dual spinning laser-based UAV positioning and landing system and method according to an embodiment of the disclosure, the first laser module is controlled to emit the first light beam to scan in the space. The second laser module is controlled to emit the second light beam to scan in the space. When the first light beam is projected on the UAV, the first included angle is obtained. When the second light beam is projected on the UAV, the second included angle is obtained. The relative location is calculated through the information of the first included angle and the second included angle. The signal transceiver is controlled to transmit the relative location signal to the UAV. Therefore, compared with image positioning or other positioning methods, the dual spinning laser-based UAV positioning and landing system and method according to the embodiment of the disclosure can perform precise landing and positioning to the UAV in a condition where the UAV only needs to install a laser receiver and a signal transceiver, that is, there are no special requirements for the hardware configuration and computing ability of the UAV itself.

What is claimed is:

1. A dual spinning laser-based unmanned aerial vehicle (UAV) positioning and landing system, comprising:
   a first laser module, configured to provide a first light beam emitted by rotating around a first axis;
   a first rotating module, connected with the first laser module, and configured to drive the first laser module to rotate around a rotation axis perpendicular to the first axis to allow the first light beam to scan in a space;
   a second laser module, configured to provide a second light beam emitted by rotating around a second axis;
   a second rotating module, connected with the second laser module, and configured to drive the second laser module to rotate around a rotation axis perpendicular to the second axis to allow the second light beam to scan in the space, wherein the rotation axis perpendicular to the second axis and the rotation axis perpendicular to the first axis are parallel to each other;

a signal transceiver;

a controller, electrically connected to the first laser module, the first rotating module, the second laser module, the second rotating module and the signal transceiver; and a substrate, wherein the first laser module, the first rotating module, the second laser module, the second rotating module, the signal transceiver and the controller are disposed on the substrate, wherein when the first light beam is first projected on a UAV, the UAV sends a signal, and after the signal transceiver receives the signal, the controller obtains a first included angle, and when the second light beam is further projected on the UAV, the UAV sends the signal, and after the signal transceiver receives the signal, the controller obtains a second included angle and calculates a relative location, and controls the signal transceiver to transmit a relative location signal to the UAV, wherein the first included angle is an included angle between the first light beam and a connection line, the second included angle is an included angle between the second light beam and the connection line, the connection line is a connecting line between the first laser module and the second laser module, and the relative location is a location of the UAV relative to a landing location on the substrate.

2. The dual spinning laser-based UAV positioning and landing system according to claim 1, wherein the first light beam comprises a first point laser light and a first linear laser light, and the first laser module comprises:

a first light source, configured to emit the first point laser light;

a second light source, configured to emit the first linear laser light;

a first reflector, disposed on an optical path of the first point laser light and the first linear laser light, and configured to project the first point laser light and the first linear laser light out of the first laser module; and a first rotator, connected with the first reflector to drive the first reflector to rotate around the first axis to allow the first point laser light or the first linear laser light to scan in the space.

3. The dual spinning laser-based UAV positioning and landing system according to claim 2, wherein the second light beam includes a second point laser light and a second linear laser light, and the second laser module comprises:

a third light source, configured to emit the second point laser light;

a fourth light source, configured to emit the second linear laser light;

a second reflector, disposed on an optical path of the second point laser light and the second linear laser light, and configured to project the second point laser light and the second linear laser light out of the second laser module; and a second rotator, connected with the second reflector to drive the second reflector to rotate around the second axis to allow the second point laser light or the second linear laser light to scan in the space.

4. The dual spinning laser-based UAV positioning and landing system according to claim 3, wherein the controller first controls the first laser module and the second laser module to project the first linear laser light and the second linear laser light, and when the first linear laser light and the second linear laser light are projected on the UAV, the first laser module and the second laser module are further controlled to project the first point laser light and the second point laser light to allow the first point laser light and the second point laser light to scan within a range where the first linear laser light and the second linear laser light intersect in the space.

5. The dual spinning laser-based UAV positioning and landing system according to claim 3, wherein when the controller controls the first laser module and the second laser module to project the first point laser light and the second point laser light to scan and have not sensed the location of the UAV, the first laser module and the second laser module are further controlled to switch to project the first linear laser light and the second linear laser light.

6. The dual spinning laser-based UAV positioning and landing system according to claim 4, wherein when the first linear laser light and the second linear laser light are projected on the UAV, the controller calculates a farthest distance based on the range where the first linear laser light and the second linear laser light intersect in the space, and the dual spinning laser-based UAV positioning and landing system satisfies:

$$\delta \le \arctan(Ws/n) \times (180/\pi),$$

wherein δ is a pitch angle of the first point laser light or the second point laser light scanning in the space, Ws is a width of a sensor on the UAV, and n is the farthest distance.

7. The dual spinning laser-based UAV positioning and landing system according to claim 1, further comprising:

an optical sensor, disposed on the substrate and between the first laser module and the second laser module, electrically connected with the controller, and configured to allow the controller to reset rotated angles of the first laser module and the second laser module by the optical sensor before the first light beam and the second light beam scan in the space.

8. The dual spinning laser-based UAV positioning and landing system according to claim 1, further comprising:

a display module, disposed on the substrate, electrically connected with the controller, and configured to display an operation status of the dual spinning laser-based UAV positioning and landing system.

9. The dual spinning laser-based UAV positioning and landing system according to claim 1, further comprising a charging module, disposed at the landing location, and electrically connected with the controller, wherein the charging module comprises:

a magnetic charging interface, configured to attach to the UAV when the UAV lands; and a lever, disposed around the magnetic charging interface, and configured to assist the UAV to break away from the magnetic charging interface when the UAV takes off.

10. The dual spinning laser-based UAV positioning and landing system according to claim 1, further comprising:

a location adjustment module, disposed on the substrate, electrically connected with the controller, and configured to clamp the UAV and move the location of the UAV to the landing location after the UAV lands.

11. A dual spinning laser-based unmanned aerial vehicle (UAV) positioning and landing method, comprising:

controlling a first laser module to provide a first light beam emitted by rotating around a first axis, and controlling a first rotating module to drive the first laser module to rotate around a rotation axis perpendicular to the first axis to allow the first light beam to scan in a space;

controlling a second laser module to provide a second light beam emitted by rotating around a second axis, and controlling a second rotating module to drive the second laser module to rotate around a rotation axis perpendicular to the second axis to allow the second light beam to scan in the space; and sending a signal from a UAV when the first light beam is first projected on the UAV, obtaining a first included angle after the signal is received, sending the signal from the UAV when the second light beam is further projected on the UAV, obtaining a second included angle and calculating a relative location after the signal is received, and controlling a signal transceiver to transmit a relative location signal to the UAV.

12. The dual spinning laser-based UAV positioning and landing method according to claim 11, wherein the first light beam comprises a first point laser light and a first linear laser light, and steps of controlling the first laser module to emit the first light beam comprise:

controlling a first light source to emit the first point laser light, controlling a second light source to emit the first linear laser light, and controlling a first rotator to drive a first reflector to rotate around the first axis to allow the first point laser light or the first linear laser light to scan in the space.

13. The dual spinning laser-based UAV positioning and landing method according to claim 12, wherein the second light beam comprises a second point laser light and a second linear laser light, and steps of controlling the second laser module to emit the second light beam comprise:

controlling a third light source to emit the second point laser light, controlling a fourth light source to emit the second linear laser light, and controlling a second rotator to drive a second reflector to rotate around the second axis to allow the second point laser light or the second linear laser light to scan in the space.

14. The dual spinning laser-based UAV positioning and landing method according to claim 13, further comprising:

first controlling the first laser module and the second laser module to project the first linear laser light and the second linear laser light, and further controlling the first laser module and the second laser module to project the first point laser light and the second point laser light to allow the first point laser light and the second point laser light to scan in a range where the first linear laser light and the second linear laser light intersect in the space when the first linear laser light and the second linear laser light are projected on the UAV.

15. The dual spinning laser-based UAV positioning and landing method according to claim 13, further comprising:

further controlling the first laser module and the second laser module to switch to project the first linear laser light and the second linear laser light when the first laser module and the second laser module are controlled to project the first point laser light and the second point laser light to scan and have not sensed a location of the UAV.

16. The dual spinning laser-based UAV positioning and landing method according to claim 14, wherein when the first linear laser light and the second linear laser light are projected on the UAV, steps of further controlling the first laser module and the second laser module to project the first point laser light and the second point laser light to allow the first point laser light and the second point laser light to scan in the range where the first linear laser light and the second linear laser light intersect in the space comprise:

calculating a farthest distance based on the range where the first linear laser light and the second linear laser light intersect in the space when the first linear laser light and the second linear laser light are projected on the UAV.

17. The dual spinning laser-based UAV positioning and landing method according to claim 11, further comprising:

resetting rotated angles of the first laser module and the second laser module by an optical sensor before the first light beam and the second light beam scan in the space.

* * * * *